May 31, 1955  H. U. GARRETT ET AL  2,709,445
BELLOWS MOUNTING FOR VALVE
Original Filed March 27, 1947  2 Sheets-Sheet 2
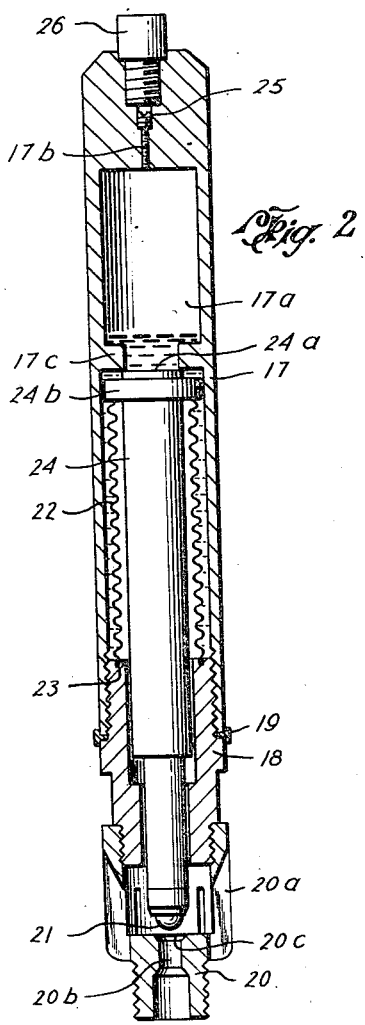
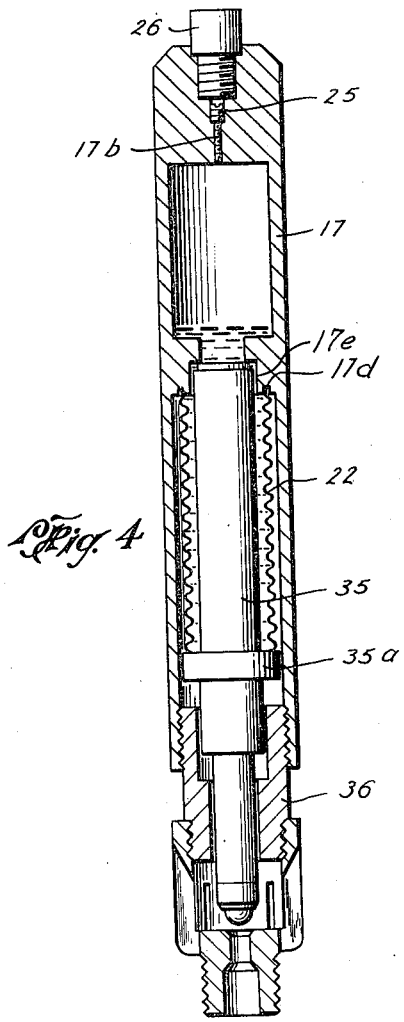
Henry U. Garrett
Clifford M. Peters
INVENTORS
BY
Browning & Simms
ATTORNEYS

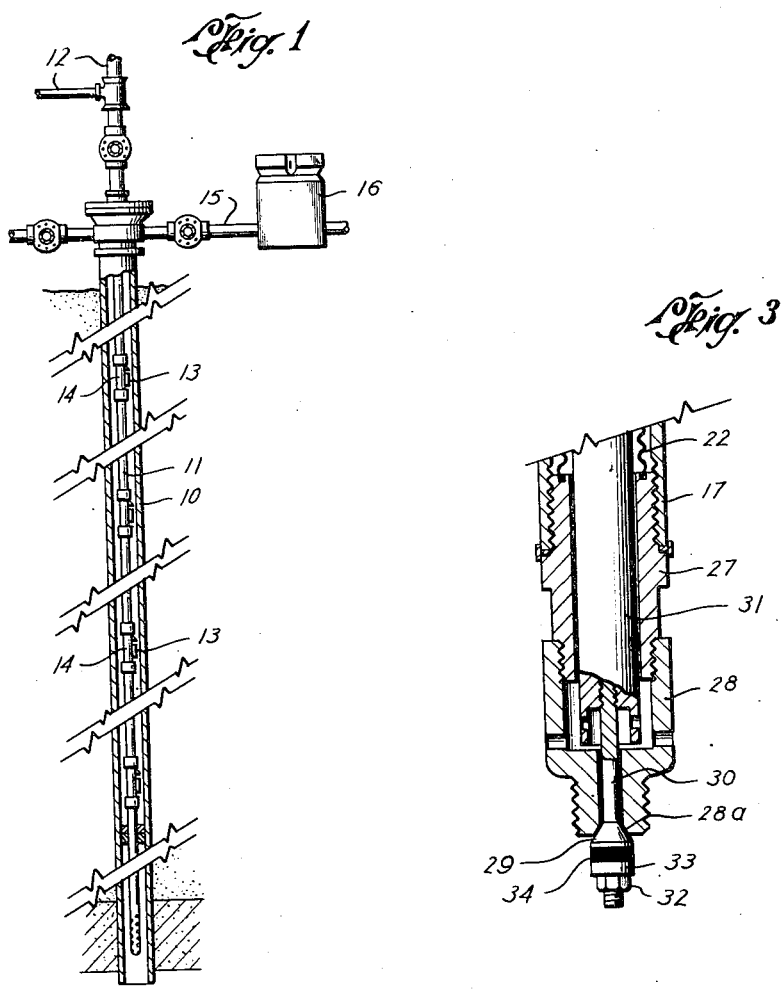

United States Patent Office 2,709,445
Patented May 31, 1955

2,709,445

BELLOWS MOUNTING FOR VALVE

Henry U. Garrett and Clifford M. Peters, Houston, Tex., assignors to Garrett Oil Tools, Inc., Houston, Tex., a corporation of Texas Original application March 27, 1947, Serial No. 737,600, now Patent No. 2,519,242, dated August 15, 1950. Divided and this application August 14, 1950, Serial No. 179,254

4 Claims. (Cl. 137—155)

This invention relates to improvements in pressure responsive valves and relates more particularly to bellows type valves.

This application is a division of our co-pending application Serial Number 737,600, filed March 27, 1947, United States Patent No. 2,519,242.

While valves according to this invention have a number of uses the valves are especially adapted for use in gas lift production of oil wells and in the description of the invention the discussion will be limited to this use, for the most part, but it is to be understood that this is done by way of illustration and not by way of limitation.

A customary method of raising well liquids to the surface has been to use bellows type pressure responsive valves for introduction of a lifting gas into the liquid column within pipe strings of well bores. However, a great deal of difficulty has been encountered due to bellows failure. When this happens the entire string of pipe on which the valves have been mounted must be withdrawn from the well bore and the valves replaced or repaired.

A cause for bellows failure in these valves is the tendency of the bellows to buckle in operation. Guides have been provided extending centrally of the bellows and having a stationary mounting relative to the bellows. However, wear caused by movement of the contact point of the bellows along the surface of the guides, or the bellows housing, in operation of the valve when the bellows tends to buckle, frequently results in bellows failure.

An object of this invention is to provide a bellows type pressure responsive valve with a guide so arranged relative to the bellows and housing to prevent contact of the bellows with the housing or guide at positions of relative movement between the bellows and the housing or guide as the bellows is flexed.

Another object is to provide in a bellows type pressure responsive instrument a mounting for a bellows within a housing and a guide therefor which maintains moving portions of the bellows out of contact with relatively stationary portions of the housing and guide.

A further object is to provide a bellows type pressure responsive valve having a bellows guide secured to the movable end of the bellows to move therewith.

Other and further objects of this invention will appear from the following description:

In the accompanying drawings which constitute a part of the instant specification, are to be read in conjunction therewith and wherein like reference numerals designate like parts in the various views;

Fig. 1 is a schematic sectional illustration of an oil well equipped with gas lift valves according to this invention, illustrating the surface and control equipment in elevation;

Fig. 2 is an enlarged sectional view of the valve constituting the preferred embodiment of this invention, the valve illustrated being that shown in Fig. 1;

Fig. 3 is an enlarged fragmentary sectional view of a modification of the valve shown in Figs. 1 and 2; and Fig. 4 is an enlarged sectional view of a valve illustrating another modification of this invention.

Referring to the drawings, and more particularly to Fig. 1, a well bore is schematically illustrated in section. The bore is equipped with an oil string of casing 10 with a conventional well head at the ground surface and a string of flow tubing 11 extending within the casing and through the well head and having flow connections 12 at its upper end. Pressure responsive valves in accordance with this invention are shown at 13 and are mounted on coupling sections 14 made up within the string of flow tubing. A gas supply line 15 has a connection through the well head with the annular space between the casing and tubing strings. The flow of gas through the line may be controlled by any suitable surface controller 16. This controller usually is of the time intermitter type and is effective to increase the pressure within the tubing casing annulus to a predetermined amount at selected time intervals. This increase in pressure is effective to open one or more of the valve devices as is customary in gas lift operations.

Referring now to the details of the valve, it will be seen by reference to Fig. 2 that the valve has an upper cylindrical housing 17. To the lower end of the housing is threadedly secured the head bushing 18. A seal is provided between the bushing and housing and may be in the form of a solder sealing ring 19. The valve body is completed by the valve head 20 threadedly secured to the lower end of head bushing 18. The valve head is provided with slotted ports 20a and has a passage 20b through its lower end. This passage contains a seat 20c which cooperates with a valve member 21 to control the flow through passage 20b in a manner which will be hereinafter more fully explained.

Bellows 22 forms a pressure chamber within the valve body. The bellows has sealing engagement with the valve body at its lower end. In this embodiment, and with the upper end of a combination bellows guide and valve stem 24, solder rings such as shown at 23 provide a suitable seal in each instance. The bellows guide has a cylindrical portion extending axially through the bellows, the outside diameter of which is somewhat less than the smallest inside diameter of bellows 22. Adjacent its lower end the guide has a portion of reduced diameter which has a slide fit within the reduced bore through head bushing 18. While the fit of the guide within the bore is close enough to maintain the axial position of the guide stem within close limits, nevertheless it is sufficiently loose to permit free passage of fluid therepast into the interior of bellows 22 and to permit free axial movement of the guide. Valve member 21 is mounted at the lower end of guide stem 24 and thus is carried by the free or upper end of bellows 22.

It is very important to properly arrange the guide within the housing and the bellows within the housing so as to eliminate the possibility of the bellows rubbing against either the guide or the housing because either would materially reduce the life of the bellows. This is accomplished, in accordance with this invention, by providing cooperating portions between the guide and body of close tolerance relative to the tolerance between the guide and bellows and the tolerance between the bellows and the housing 17. The cooperating parts, as shown in Fig. 2, may include the slide fit of the guide both at its reduced diameter portion and its large diameter portion, within the bores of bushing 18; and the cap 24b having a slide fit within housing 17.

The arrangement preferably is such that the portion of the guide adjacent the end of the bellows anchored to the body has a close fit with the body of less tolerance than the space between the guide and bellows. This is important because the relative movement of the guide and bellows is greatest here. Similarly the guide and body have the close fitting parts at the end of the bellows secured to the guide which is of closer tolerance than the fit of the bellows within the housing. This latter is the cap 24b which protects the bellows from the housing adjacent the point of greatest movement of the bellows relative to the housing.

The pressure chamber itself is made up of a bellows portion and an upper dome portion 17a adapted to be charged with a fluid under pressure. Suitable charging means is provided such as the pressure fluid passage 17b controlled by a conventional spring pressed valve core 25. Preferably a sealing cap 26 is secured in the end of passage 17b and is soldered or otherwise sealed to the end of the housing to insure against loss or escape of the pressure charge.

Housing 17 has an inner apertured partition 17c which separates the pressure dome portion of the chamber from the bellows. Stem 24 carries a sealing cap 24a which seats against the lower side of partition 17c to close off the pressure dome from the bellows when the bellows has been flexed to the extent shown in Fig. 2. With the bellows in its other extreme flexed condition the valve member 21 engages seat 20c and sealing cap 24a is spaced somewhat below partition 17c. Thus the dome portion of the pressure charged chamber is in communication with that portion of the chamber defined in part by the bellows.

It will be noted that the upper or sealing surface of cap 24a is spaced somewhat above the annular shoulder formed by the upper surface of the portion 24b of somewhat enlarged diameter of guide 24. This is provided so that when the pressure dome portion of the chamber is sealed off from the bellows portion of the charged chamber and the pressure within the bellows portion should be increased for any reason above that within the dome and also above that within the interior of the bellows when the bellows will be collapsed somewhat to move sealing cap 24a from sealing engagement with the underside of partition 17c. This permits a relief of the excess pressure and equalizes the pressure within the dome and the other portion of the charged chamber. Thus, there has been provided an automatic valve for relieving excessive pressures that may develop within the bellows housing. This automatic valve is encased within the pressure chamber where it is protected from foreign material which might prevent it from forming a seal.

The excessive pressures just referred to are likely to be built up when a liquid is employed within the bellows portion of the pressure charged chamber due to expansion of the liquid when cap 24a is in sealing engagement about the aperture of partition 17c and the temperature of the liquid is raised as is frequently the case in installing such valves in wells producing from deep formations.

Whenever the valves of this invention are likely to be subjected in use to pressures materially greater than the charge within the pressure dome, it is preferable to fill the pressure charged part of the chamber with sufficient liquid to completely fill the bellows portion thereof when the cap 24a is in sealing engagement with the underside of partition 17c. However, the liquid level should not be sufficiently high to materially reduce the volume of pressure dome 17a, as a relatively large volume of gas insures free, sensitive flexure of the bellows to open and close the valve. This liquid in the sealed off bellows portion of the chamber provides a non-compressible backing for the bellows, which protects the bellows against the excessive pressure such as encountered when the valves are subjected to a hydrostatic head due to a column of liquid of hundreds or thousands of feet. The seal between the cap 24a and partition 17c is within the pressure chamber and there is no possibility of foreign material from the interior of the well bore interfering with proper formation of a seal as is the case in the valves heretofore used, wherein an attempt has been made to seal off the bellows chamber itself from excessive pressures exterior of the valve.

In operation a series of the valves such as shown in Fig. 2 may be connected into coupling units 14 by threading the lower end of valve head 20 into fittings 14a of the units. These units are then placed within the flow tubing string as the tubing string is made up and lowered within the casing and form a part thereof, or may be installed in the well in any other suitable manner. The valves 13 are charged with different pressures, the upper valve being charged with the greatest pressure and each successive lower valve charged with successively reduced pressures. Thus, the upper valves are used to dump the liquid accumulated in the well prior to and during installation of the valves and when the liquid has been reduced to a position below the second lowest valve when the lowest or working valve is utilized in normal production. The working and dumping of the well is according to conventional practice and is controlled by controller 16 in a manner well understood by those skilled in the art.

With regard to the operation of the valve, it is believed obvious that when the pressure in the casing tubing annulus exceeds the pressure charge of an individual valve 13, that is the pressure charge within the dome and bellows portion of the pressure chamber, that the pressure differential will cause a flexure of bellows 22 until cap 24a engages partition 17c. Preferably sufficient liquid is placed within the pressure chamber to completely fill the bellows portion of the pressure chamber with the dome portion sealed off. The liquid forms a backing for the bellows and an increase of casing tubing annulus pressure at a point about the valve will not effect further distortion of the bellows except within the compressible limits of the liquid, which for practical purposes, can be disregarded and considered as zero. Thus, the bellows is protected from the pressure exterior of the valve even though it is extremely high. This protection is positive and does not rely upon proper engagement of a valve and seat in a construction wherein the valve and seat are exposed to the foreign material, sand and the like, always present within a well bore. The sealing cap 24a and cooperable seating surface of partition 17c are protected from any such foreign material.

In installing gas lift valves in a producing oil well when the string of tubing is made up with the valves in place and lowered into the casing, the valves are of course held closed by the pressure within the pressure dome until the exterior of the valves is exposed to pressures greater than the charge within the pressure chamber of the valve housing. When the exterior pressure increases sufficiently to flex the valve bellows the valves are opened and sealing cap 24a, with the valve member 21 in completely open positions, closes off the pressure dome portion of the pressure charged chamber.

In operation, as the pressure within the casing tubing annulus decreases the pressure within the pressure charged chamber of the valves flexes bellows 22 whereby the end of the bellows connected to guide 24 is moved downwardly and effects a seating of valve member 21 in seat 20c to close the valve.

During the opening and closing operations of any of the valves 13, the guide 24 moves in a direction corresponding with the movement of the bellows 22. This corresponding movement reduces the relative movement between any portion of the bellows which might be in contact with the periphery of the guide due to slight buckling of the bellows. Thus wear of the contact portion of the bellows is reduced and the guide effectively prevents buckling of bellows 22 and serves to keep it in proper axial alignment. The guide has portions which fit close to the housing so that the bellows is held away from contact with the guide for it is spaced relatively far from the guide. The cap 24b has a close or slide fit within the housing 17 holding the bellows spaced from the housing wall at the point of greatest movement of the bellows. The fit of the guide within head 18 holds the guide away from the bellows at their points of greatest movement.

It will be appreciated that the pressure charge within the valve shown in Fig. 2 acts against the outer periphery of bellows 22. This makes possible the charging of the valve with a greater pressure than where the interior of the bellows receives the charge. This makes possible greater spacing of the valves within the flow tubing 14 and also provides a greater working pressure for the working valve adjacent the bottom of the well.

In Fig. 3 there is shown a slight modification of the valve of Fig. 2. The difference in this modification is that the valve is a pressure opened valve rather than a pressure closed valve. A slightly modified head bushing 27 having a uniform diameter bore is threaded to housing 17 and a modified valve head 28 is threaded to the lower end of bushing 27. This valve head 28 has radial ports communicating with the exterior of the valve and has an axial passage through one end with a seat 28a cooperable with valve member 29 to control flow through the radial and end ports. Valve member 29 has a sliding fit on stem extension 30 carried by a somewhat modified valve stem and bellows guide 31. The free end of extension 30 carries a stop assembly comprising a bolt 32, washer 33 and cushioned washer 34. The washer 34 is made of resilient material and the arrangement permits seating of valve member 29 in seat 24a slightly before the bellows is expanded to its extreme raised position.

The cushioned stop assembly made up of nut 32 and washers 33 and 34 is provided so that in the event of wear of either the valve seat 28a or valve member 29 the valve will be closed whenever the pressure exterior of the valve exceeds that of the charge within the pressure charged chamber of the valve.

The fit of the guide within the bore through head 27 is again closer than that of the guide and the bellows to provide cooperating parts maintaining the guide in proper alignment. A head part 24b may also be used which has a close fit within the housing this reducing the likelihood of contact between the bellows and guide or housing.

In installation this modification of the valve is connected within the well tubing string in the same manner as the valve of Fig. 2 as the lower end of valve head 28 may be threaded into fitting 14a of a coupling member 14 which in turn may be fitted within the tubing string. However, the pressure within the tubing casing annulus holds the valve closed so that it is possible to produce a well at a higher pressure at the working valve than the pressures at which the dumping valves operate. Each successively lower dumping valve may be set to remain open at successively higher pressures so the highest pressures may be utilized to operate the well.

Referring now to the modification of Fig. 4 it is seen that the principal difference between it and the valve of Fig. 2 resides in the inverted position of the bellows wherein the upper end of the bellows is sealed at 17d to housing 17 and at its lower end to an enlarged diameter portion 35a of the combined valve stem and bellows guide 35.

The guide and housing have similar cooperating parts or portions so as to afford maximum protection for the bellows as do the Figs. 2 and 3 embodiments. The enlarged guide part 35a has a closer fit within the housing than does the bellows so as to hold the bellows from the housing at its end that moves relative to the housing. The end of guide 35 remote from the valve member fits within a socket 17e formed in the housing with less clearance than exists between the guide and the interior of the bellows. This positively spaces the bellows and guide apart at their positions of greatest relative movement.

In this modification the part of the pressure chamber defined by the bellows resides within the bellows and the valves may not be charged with quite as great a pressure as that of Fig. 2 where the bellows is made up of the same material and has the same structural characteristics. In this connection, it has been found that a three ply seamless Monel metal bellows gives satisfactory service in both instances. The advantage of the structure of Fig. 4 over that of Fig. 2, on the other hand, is that no seal need be provided between the head bushing 36 and the lower end of housing 17. The advantages of the elimination of this sealed joint are believed to be obvious.

The operation of this valve is similar to that of the modification of Fig. 2 and it is believed to be obvious in view of the foregoing description of the operation of the other modifications and in the interest of simplicity, further description of the operation will be dispensed with.

It will be seen that the objects of this invention have been accomplished. There has been provided a bellows type pressure responsive valve wherein the bellows is positively protected against excessive external pressures to which it may be subjected. The construction lends itself to economical fabrication and provides a valve of great utility which may be used in gas lift production of oil and in other operations requiring this type of valve. The arrangement is such that there is little tendency for the bellows to wear or buckle during flexing operations and the flexure of the bellows, in response to the pressure changes to which it is exposed, is free within predetermined limits as a large volume pressure chamber is provided during these limits.

From the foregoing it will be seen that this invention is one well adapted to attain all of the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

As many possible embodiments may be made of the invention without departing from the scope thereof it is to be understood that all matter herein set forth or shown in the accompanying drawings is to be interpreted as illustrative and not in a limiting sense.

The invention having been described, what is claimed is:

1. A pressure actuated device comprising a housing having a cylindrical opening therein, a bellows disposed in said opening and having one end secured to said housing to seal off a pressure chamber therein, a cylindrical bellows guide extending through and next adjacent to the bellows and sealingly connected to the other end thereof to seal it off and complete the pressure chamber, a first part carried by the guide adjacent its connection to the bellows and having a slide fit with the housing providing less clearance than the lateral clearance between the housing and a portion of the bellows immediately adjacent said other end thereof, a second part carried by the guide having a slide fit with a guide portion of the housing adjacent the connection between the housing and bellows, the clearance between said second part and said housing being less than the clearance between a portion of the bellows adjacent the secured end thereof and the guide portion laterally adjacent thereto.

2. A pressure responsive gas lift valve of the pressure charged type which comprises, in combination, a hollow housing, inlet and outlet ports in the housing for passing fluid exteriorly of the housing through a portion thereof and into a conduit to be charged, a bellows within the housing and having a fixed end sealingly secured to the housing to seal off a pressure chamber remote from the inlet and outlet ports, a pressure charge in said chamber, a cylindrical guide extending coaxially through and next adjacent to the bellows and sealingly connected to the movable other end of the bellows to complete the pressure chamber, said bellows being laterally spaced a substantial distance from both the guide and housing, said guide also having a portion extending away from the bellows and pressure chamber, a valve member carried by said guide portion, a valve seat cooperable with said valve member to control flow through said ports, first cooperating aligning parts carried by the housing and guide adjacent said movable end of the bellows and having a sliding fit of substantially less clearance than the lateral clearance between a portion of the bellows adjacent said movable end thereof and the housing, second cooperating aligning parts carried by the guide and housing adjacent said fixed end of the bellows and having a sliding fit of substantially less clearance than the lateral clearance between a portion of the bellows adjacent the fixed end thereof and the guide, said first and second aligning parts and said valve seat being longitudinally spaced apart from each other so that said valve member is maintained in seating alignment with said valve seat and, at the same time, said fixed end of the bellows is prevented from rubbing on the guide and said movable end of the bellows is prevented from rubbing on the housing.

3. The valve of claim 2 wherein said valve seat is disposed intermediate said pressure chamber and said valve member so that said pressure charge urges the valve member to unseated position.

4. A gas lift valve which comprises, in combination, a housing, a bellows within the housing and sealing off a variable volume pressure chamber therein, a fluid passage through the housing remote from said pressure chamber and adapted to pass fluid exteriorly of the housing into a conduit to be charged, a valve seat surrounding a portion of said passage, a valve member cooperable with said seat to control flow through said passage, a force transmitting connection between said bellows and valve member, said valve seat being disposed intermediate said valve member and bellows so that movement of said valve member toward said seat decreases the volume of said chamber, the side of the bellows remote from said chamber being in fluid communication with the exterior of said housing, and guide means aligning said valve member with said seat.

References Cited in the file of this patent

UNITED STATES PATENTS

| | | |
|---|---|---|
| 1,712,882 | Gleason et al. | May 14, 1929 |
| 1,952,581 | Boynton | Mar. 27, 1934 |
| 2,250,464 | Boynton | July 29, 1941 |
| 2,264,282 | Ambrose | Dec. 2, 1941 |
| 2,339,487 | King | Jan. 18, 1944 |
| 2,368,999 | O'Leary | Feb. 6, 1945 |
| 2,446,680 | Walton | Aug. 10, 1948 |
| 2,519,242 | Garrett | Aug. 15, 1950 |